Oct. 1, 1957 B. H. GEYER, JR., ET AL 2,808,203

BINARY SHIFT REGISTER

Filed Feb. 28, 1952

Inventors:
Bernard H. Geyer, Jr.
Curtis D. Cockburn,
by Merton D. Moore
Their Attorney.

United States Patent Office 2,808,203

Patented Oct. 1, 1957

2,808,203

BINARY SHIFT REGISTER

Bernard H. Geyer, Jr., Syracuse, and Curtis D. Cockburn, Baldwinsville, N. Y., assignors to General Electric Company, a corporation of New York Application February 28, 1952, Serial No. 273,888

7 Claims. (Cl. 235—61)

Figure 1:
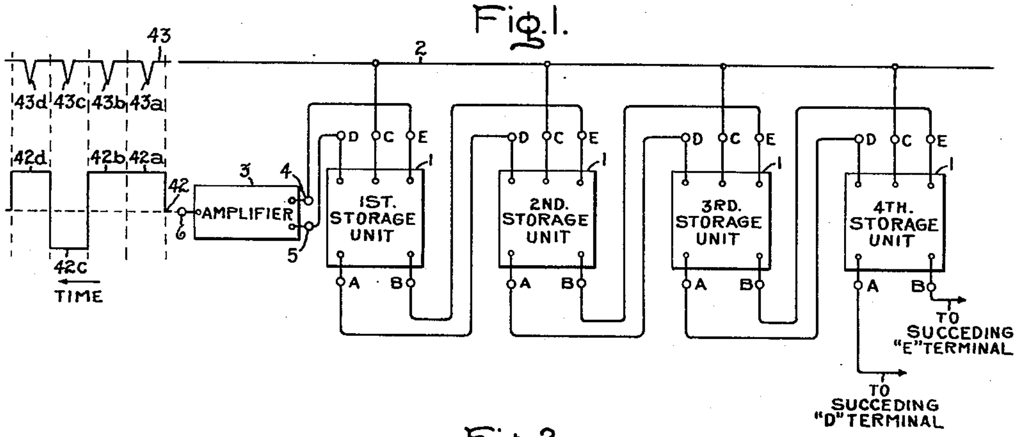

Our invention relates in general to computing apparatus of the type that employs a binary number system and, in particular, to such apparatus known in the art as shifting registers and components of shifting registers.

In the binary system of numbers, there are only two possible numbers which are usually expressed as "1" and "0" although it is possible to think of the two as being "on-off," "yes-no," "good-bad," etc. To represent any whole decimal number, it is only necessary to assign each digit in a binary expression a value corresponding to the number 2 raised to a successive power and then indicate the presence or absence of that value in the expression, for example, by a "1" or a "0," respectively, in the digit place. The well-known binary number system is thus illustrated by the following table which shows at the top the values assigned to the respective binary digit places.

| Binary System | | | | | Decimal System |
|---|---|---|---|---|---|
| $2^n$ . . . $2^3$ | $2^2$ | $2^1$ | $2^0$ | | |
| 0 | 0 | 0 | 0 | = | 0 |
| 0 | 0 | 0 | 1 | = | 1 |
| 0 | 0 | 1 | 0 | = | 2 |
| 0 | 0 | 1 | 1 | = | 3 |
| 0 | 1 | 0 | 0 | = | 4 |
| 0 | 1 | 0 | 1 | = | 5 |
| 0 | 1 | 1 | 0 | = | 6 |
| 0 | 1 | 1 | 1 | = | 7 |
| 1 | 0 | 0 | 0 | = | 8 |
| 1 | 0 | 0 | 1 | = | 9 |
| 1 | 0 | 1 | 0 | = | 10 |
| 1 | 0 | 1 | 1 | = | 11 |
| etc. | | | | | etc. |

The use of the binary number system is particularly facilitated, as is known to those skilled in the computer art, by the use of fast-acting Eccles-Jordan "flip-flop" or triggered multivibrator circuits which have only two stable states of conduction, one of which may be designated as representing a binary "1" and the other of which may be designated as representing a binary "0." By assembling an array of such multivibrator circuits in the form of a register, letting each represent one binary digit place, and causing each to be in the proper conduction state, any binary number can be represented electrically. Since the multivibrator circuits remain in a given conduction state until excited by an externally initiated voltage pulse which causes them to switch to the other state, they are commonly called "storage units," for by this nature they "store" or hold the binary number they represent in a given conduction state until externally excited. By properly causing external pulses to switch the various storage units in a given manner, it is possible to have addition, subtraction, multiplication, and other mathematical operations automatically performed on numbers stored in binary form within one or more registers.

One of the useful parts of an electronic binary computer is a shifting register wherein a string of binary digits may be shifted along from one storage unit to the next, i. e., each number in a binary expression shifted from one digit place to the next within the register. This is necessary in most multiplication operations and in reading a binary expression into or out of a register. For example, to store the decimal number 11 in a register of four storage units, it is neither desirable nor convenient to have the register act as a counter so that the input has to be pulsed eleven times. Instead, a pulse sequence signal voltage train having two portions indicative of binary "1," a portion indicative of binary "0," and another portion indicative of binary "1," in that sequence, is supplied to the shifting register and corresponding conduction states shifted along from one storage unit to the next by transfer units which permit certain storage units to be properly triggered in response to four actuating or triggering pulses from a pulsing bus or source.

In a previously known typical arrangement, the shifting of a binary number through different digit places of a shifting register is accomplished by supplying a series of periodic or aperiodic triggering voltage pulses to a plurality of gating circuits each associated with one storage unit in the register. Each gating circuit senses the number information held by its storage unit, and the storage unit preceding its storage unit in the shifting sequence, by sensing the potentials at anodes in these storage units. If the number held by its storage unit is different from that held by the preceding storage unit, the sensed potentials render the gating circuit conductive to the triggering pulse and the pulse is passed through to its storage unit which is thereby triggered to its opposite conduction state and into agreement with the number held by the preceding storage unit. Conversely, if the number held by its storage unit is the same as that held by the preceding storage unit, the gating circuit is non-conductive to the triggering pulse and its storage unit remains untriggered in agreement with the number held by the preceding storage unit. As a result of each voltage triggering pulse applied to all of the gating circuits, the numbers held by each storage unit are shifted one digit place to the next storage unit.

The above-described prior art arrangement requires that the gating circuit prevent passage of a triggering pulse to a storage unit when its storage unit is not to be triggered; and every pulse that is passed through the gating circuit triggers the corresponding storage unit. The pulses are applied at a center point in the storage unit and serve to trigger the storage unit from either conduction state to the other. This is called "center triggering" the storage unit wherein the triggering voltage pulse is applied to a common triggering terminal from the gating circuit. To accomplish this, the gating circuit must, as stated, sense the potentials at the anodes of both its own storage unit and the preceding storage unit in the shifting sequence. The suppressed voltage pulses sometimes appear in appreciable strength at the sensed anodes and cause spurious triggering of either or both sensed storage units.

It is an object of our invention to provide new, improved, and simplified binary system computing apparatus of the shifting register type.

It is another object of our invention to provide a new and improved storage unit and logic pulse routing circuit for use in a shifting register.

It is another object of our invention to provide a shifting register wherein only two potentials must be sensed by pulse gating or routing circuits.

It is a further object of our invention to provide a shifting register wherein it is not required that triggering voltage pulses be suppressed.

And, it is still another object of our invention to provide a storage unit wherein the anodes of storage units being sensed are effectively isolated from the influence of triggering voltage pulses and spurious triggering of storage units is eliminated or considerably reduced.

In carrying out the aforestated objectives, the shifting register of our invention, in one form thereof, may be embodied by a plurality of storage units each having a "triggered multivibrator" or Eccles-Jordan type "flip-flop" circuit which, as differentiated from "center-triggered" types of such circuits wherein each of a group of consecutive triggering pulses applied to a common triggering terminal switches the conduction state, is of the "side-triggered" type wherein the conduction state is changed by applying alternate triggering pulses, which are to be effective, to a different one of the two control electrodes of the discharge device or devices therein. The storage units are arranged in a linear array and each may represent by its two possible conduction states a binary "1" or "0" in one digit place of a binary expression. Each storage unit further includes a potential sensing and pulse routing network which serves as means for sensing the potentials at the anodes in the previous storage unit and means, including unidirectional impedance devices biased by the sensed potentials, for routing a received triggering voltage pulse to one or the other of the control electrodes of the storage unit according to the sensed potentials. If a designated anode in the preceding storage unit is non-conductive, the triggering pulse, if chosen to be a negative potential change, is routed to the corresponding control electrode in the given storage unit. If the corresponding anode in the given storage unit, therefore, is non-conductive, i. e., the numbers stored by the storage units are the same, the negative triggering pulse has no effect on the given storage unit. If, however, the corresponding anode in the given storage unit is conducting current, i. e., the numbers stored are not the same, the negative triggering pulse serves to switch the conduction state of the given storage unit. Thus, only the anodes of the preceding storage unit are sensed and each triggering pulse is passed, but routed by the sensing and routing network to the proper control electrode with the result that the given storage unit is triggered or not triggered so that it is in number agreement with the preceding storage unit. Means including unidirectional impedance devices for isolating the sensed anodes of the preceding unit from the effects of the triggering pulses are also provided, so that spurious triggering is not encountered.

Figure 2:
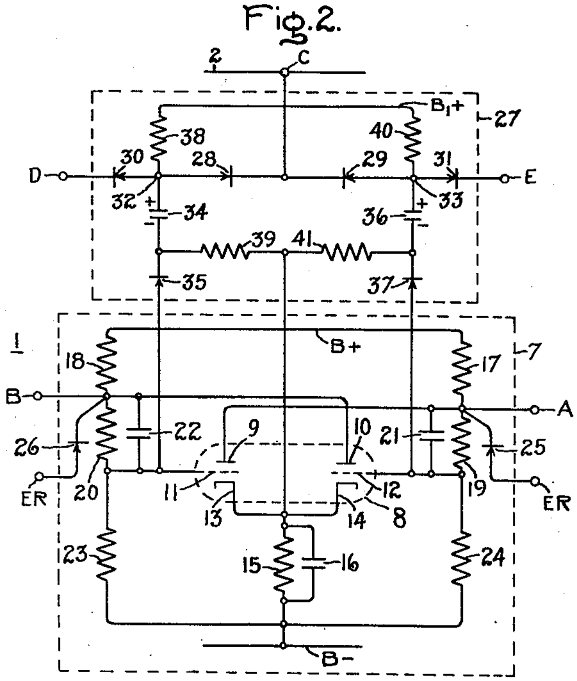

The novel features of our invention are pointed out with particularity in the appended claims. However, for a better understanding of the invention, together with further objects and advantages thereof, reference should now be had to the following description taken in conjunction with the accompanying drawing, wherein:

Fig. 1 is a diagrammatic illustration of the shifting register of our invention; and Fig. 2 is a schematic circuit diagram of a preferred storage unit including a triggered multivibrator and a sensing and routing network according to our invention.

Referring now to Fig. 1, we have there shown in block and line form a new and improved binary system shifting register embodying our invention and comprising a plurality of shifting register storage units 1. Each of the storage units 1, more clearly illustrated in Fig. 2 and to be more fully described in connection therewith, includes a "flip-flop" circuit or triggered multivibrator which has two stable states of conduction each indicative of one of two binary numbers. Thus, each storage unit 1 by its instant conduction state may represent a binary number in one digit place of a binary expression, in the illustration a four-digit binary expression although any number of digit places may be represented by a like number of storage units. The illustrated shifting register is arranged to shift stored binary numbers from left to right although it will become apparent that the arrangement may be slightly modified to afford shifting from right to left.

Each storage unit 1 has two oppositely designated output terminals A and B which complementally reside at two predetermined potentials during the two stable conduction states thereof. The potential of either of these terminals may, therefore, be taken as an indication of the number held by a storage unit 1. The storage units 1 each further include a potential sensing and pulse routing network, including a voltage pulse input terminal C and two sensing terminals D and E. All of the input terminals C are provided for connection to a source of voltage pulses illustrated as a pulsing bus 2 while the sensing terminals D and E of each given storage unit 1 are connected to sense the potentials at the output terminals A and B respectively of the storage unit 1 preceding in the shifting sequence, i. e., the A and B output terminals of the storage unit 1 on the left. As will be more fully explained, the potentials of A and B output terminals of the preceding storage unit sensed by the sensing terminals D and E of a given storage unit enable the potential sensing and pulse routing network within the given storage unit to "logically" determine the binary number held by the preceding storage unit and to route voltage pulses received at input terminal C to a proper point in the multivibrator of the given storage unit so that the conduction state of the given storage unit is changed, i. e., its multivibrator is triggered, only if the number originally held by the given storage unit is different from the number held by the preceding storage unit.

An input amplifier 3 having two output terminals 4 and 5 and a single input terminal 6 is also shown at the left end of the shifting register of Fig. 1, the sensing terminals D and E of the first storage unit on the left being connected to sense the potentials at output terminals 5 and 4, respectively. Amplifier 3, to be more completely described hereinafter together with the operation of the shifting register, is shown to clarify operative description to be given hereinafter and forms no part of the present invention.

Turning now to Fig. 2, wherein a complete schematic circuit diagram of a storage unit 1 is given, the storage unit 1 comprises an Eccles-Jordan type "flip-flop" circuit or triggered multivibrator 7, enclosed by dashed lines, which may be of any well-known type, for example, such as shown in U. S. Patent 2,554,994, issued May 29, 1951, to B. R. Lester and assigned to the assignee of the present invention. Multivibrator 7 comprises an electron discharge device 8 of the twin-triode type, although it will be understood that two separate electron discharge devices, of which twin-triode 8 is equivalent, may be equally well employed. Discharge device 8 includes a pair of anodes 9 and 10, and control electrodes 11 and 12 and cathodes 13 and 14 respectively associated therewith. Cathodes 13 and 14 are connected through a common cathode resistor 15, shunted by a capacitor 16, to a source of negative operating potential indicated conventionally as B−. Anodes 9 and 10 are connected through load resistors 17 and 18, respectively, to a source of positive operating potential indicated conventionally as B+. Each anode is cross-coupled to the control electrode associated with the other anode by circuit means, such cross-coupling means between anode 9 and control electrode 12 being embodied by a resistor 19, and between anode 10 and control electrode 11 embodied by a resistor 20. Resistors 19 and 20 are paralleled by capacitors 21 and 22, respectively, to permit a faster voltage rise at the control electrodes whenever switching of the multivibrator occurs. Control electrodes 11 and 12 are returned to B− by resistors 23 and 24, respectively, which, by voltage divider action with resistors 20 and 19, reduce the voltage swing of the control electrodes 11 and 12 during switching, also reducing control electrode current and making possible the use of a voltage pulse small in amplitude for reliable triggering of multivibrator 7.

Two clamping rectifiers 25 and 26 are connected between anodes 9 and 10, respectively, and a point of reference potential illustrated as $E_R$. These clamping rectifiers 25 and 26 are poled to conduct current in a conventional sense toward their respective anodes 9 and 10, and insure that the conductive anode does not fall below the reference potential. That is, if at any time an anode carries so much current that, due to the drop across its load resistor, it tends to drop below the $E_R$ potential, the clamping rectifier supplies current to the anode, thus reducing the load resistor current and stabilizing the anode potential at the reference potential. Output terminals A and B are connected to anodes 9 and 10, respectively, and thus may be termed "anode terminals."

Multivibrator 7 operates in a well-known manner, having two stable states of conduction. Either anode 9 or anode 10 conducts saturation current at any one time but both cannot conduct simultaneously. Therefore, during alternate ones of the two conduction states anodes 9 and 10 alternately reside each at one of two predetermined complementing potentials. Whichever anode is conducting at any one time resides at a relatively low potential with respect to B+, due to the voltage drop across its load resistor, while the non-conducting anode resides at a relatively high complementing potential approximately equal to B+. During this condition the control electrode associated with the conducting anode receives the high potential of the non-conducting anode and so is biased to current saturation; the control electrode associated with the non-conducting anode receives the low potential of the conducting anode and is so biased to current cutoff. This condition prevails until a voltage pulse is applied to one of the control electrodes to upset the stability, i. e., to "trigger" the multivibrator whereupon the two anodes rapidly switch potentials and conduction of current.

A negative voltage pulse applied at the control electrode associated with the conducting anode or a positive voltage pulse applied at the control electrode associated with the non-conducting anode will serve to trigger the multivibrator by reducing or initiating anode conduction, respectively, and producing a voltage pulse of opposite polarity which is transferred to the other control electrode in a cumulative action. However, a negative voltage pulse applied at the control electrode associated with the non-conducting anode will not cause triggering since the effect is only to drive the control electrode of the non-conducting anode further into cutoff.

We prefer to say that a storage unit 1 stores or holds a binary "1" whenever anode 9 is conducting and terminal A is at low potential. With this arbitrary definition, which could just as conveniently be assumed in the opposite sense, the output terminals A and B and the anodes 9 and 10 are oppositely designated and the following conditions may be stated for a storage unit 1:

| Binary Number Stored | Potential at Terminal A | Potential at Terminal B |
|---|---|---|
| 1 | low ($\cong E_R$) | high ($\cong$B+). |
| 0 | high ($\cong$B+) | low ($\cong E_R$). |

Each storage unit 1 further includes a potential sensing and pulse routing network 27, shown enclosed by dashed lines, which includes input terminal C and sensing terminals D and E. Network 27 comprises means for side triggering, i. e., triggering by a voltage pulse applied to that one of control electrodes 11 and 12 which is at that instant associated with the conducting anode, the multivibrator 7 associated therewith in response to the potentials sensed at terminals D and E and a voltage pulse applied to terminal C only if the sensed potentials are indicative of a different binary number from that originally held by the associated multivibrator 7. In the preferred illustrated embodiment, unidirectional impedance means are provided connecting input terminal C and sensing terminals D and E to control electrodes 11 and 12. That is, two unidirectional impedance devices or rectifiers 28 and 29 are connected in series opposition, forming a junction, i. e., terminal C, therebetween and thereby being oriented with like polarity as regards passing current to junction C from one or the other of control electrodes 11 or 12. Means for biasing rectifiers 28 and 29, each in accordance with one sensed potential, are provided by unidirectional impedance devices or rectifiers 30 and 31, which are connected to rectifiers 28 and 29, respectively, opposite terminal C, thereby forming two other junctions 32 and 33 and providing the sensing terminals D and E. Rectifier pairs 28 and 30 and 29 and 31 are thus in series opposition with respect to junctions 32 and 33, respectively. A capacitor 34 is connected to junction 32 and a unidirectional impedance device or rectifier 35 is connected from the opposite side of capacitor 34 to control electrode 11. Similarly, a capacitor 36 and a rectifier 37 are connected between junction 33 and control electrode 12. Retcifiers 35 and 37 are poled in a sense opposite to the poled sense of rectifiers 28 and 29, respectively, with respect to junctions 32 and 33, i. e., rectifiers 35 and 37 are poled to conduct current which is passed by rectifiers 28 and 29, respectively, and thereby serve as means for transferring voltage pulses received at terminal C and passed by rectifiers 28 or 29 to control electrodes 11 or 12, respectively.

Considered in another light, the potential sensing and pulse routing network 27 is a symmetrical network made up of two pulse-gating circuits, each receiving pulses at the common input terminal C, sensing a potential at a sensing terminal D or E, and either passing or not passing a received pulse to the pulse receiving circuit associated therewith, i. e., the circuits of control electrode 11 or 12. That is, the first gating circuit is made up of a first rectifier 30, and a second rectifier 28 connected in series opposition and providing junction 32 therebetween. Capacitor 34 is connected to junction 32 and a third rectifier 35 is connected, opposite junction 32, in series with capacitor 34 with a polarity, with respect to junction 32, opposite that of second rectifier 28. Thus, pulse current, and only pulse current, may flow in only one direction through rectifiers 28, 35 and capacitor 34. Resistors 38 and 39 provide circuit means for passing current through capacitor 34 in a direction opposite which current flows therethrough when also flowing through rectifier 35. The second gating circuit is similarly made up of first, second, and third rectifiers 31, 29, and 37 together with capacitor 36 and resistors 40 and 41. In the two gating circuits, first rectifiers 30 and 31 provide sensing terminals D and E opposite junctions 32 and 33; second rectifiers 28 and 29 provide, opposite junctions 32 and 33, terminals for connection to a common source of voltage pulses; and third rectifiers 35 and 37 provide terminals for connection to pulse-receiving circuits. While each gating circuit may be considered as a separate component, two such gating circuits combined in the whole network 27 work in complemental conjugation, since they sense complementing potentials, to provide a unique pulse routing action of pulses received at a common terminal.

Capacitors 34 and 36 serve as D. C. isolators between junctions 32 and 33 and the upper ends of rectifiers 35 and 37, respectively, whereby only pulses and not direct current are transferred from the junctions 32 and 33 to control electrodes 11 and 12. Means for passing current through capacitor 34 in a direction opposite to current passed therethrough when rectifier 35 conducts, are provided, as noted above, by a resistor 38 connected between junction 32 and a second source of positive operating potential conventionally indicated by $B_1$+ and by a resistor 39 connected between capacitor 34, opposite junction 32, and cathodes 13 and 14. In other words, capacitor 34 is discharged by current pulses flowing in one direction through rectifier 35 and resistors 38 and 39 serve as means for recharging capacitor 34 by current flow from $B_1$+ to cathodes 13 and 14. Rectifier 35 prevents the potential drops caused by the recharging current from affecting the potential of control electrode 11. Resistors 40 and 41 are similarly provided and connected for recharging capacitor 36.

It will be seen at this point that rectifiers 35 and 37, which are part of the connections from junctions 32 and 33 to control electrodes 11 and 12, respectively, serve as means for allowing pulses of only one polarity occurring at junctions 32 and 33 to affect the potential of control electrodes 11 and 12; and similarly for preventing voltage drops produced by capacitor charging currents from affecting the potentials of control electrodes 11 and 12. A further important feature of our invention is that rectifiers 30 and 31, which serve as means for biasing rectifiers 28 and 29 each with one of the sensed potentials, also serve as means for effectively isolating the sensed points from the effects of voltage pulses of a predetermined polarity received at terminal C and passed by either rectifier 28 or 29. This will become more apparent from the following description of circuit operation.

For purposes of illustrative simplicity in an understanding of the operation of storage unit 1, in Fig. 2, and in no sense by way of limitation, let it be assumed that the B+ potential is +55 volts, the B− potential is − 135 volts, the reference potential $E_R$ is 0 volt, the $B_1+$ potential is in the order of +275 volts, and the pulsing bus 2 is normally at +55 volts and is driven down to 0 volt potential during negative voltage pulses supplied thereover. Let it further be assumed that the load resistor, coupling resistor, and grid return resistor for each discharge device are so proportioned that the anode of a non-conducting discharge device resides at about +50 volts potential. As has been previously explained, the clamping diodes insure that the anode of a conducting discharge device resides at the $E_R$ potential which is assumed to be 0 volt in potential. With these assumptions, it may be stated that when the storage unit 1 holds a binary "1," anode 10 is at +50 volts potential and anode 9 is at 0 volt potential. Conversely, when the storage unit 1 holds a binary "0," anodes 10 and 9 reside at the complementing 0 and +50 volts potentials, respectively.

Now when a given storage unit 1 is connected from its D and E terminals to the A and B terminals of the preceding storage unit 1, the D and E terminals sense complementing potentials of 0 and +50 volts. There are four possible combinations or cases of the binary numbers held by the given and the other (preceding) storage units 1:

| Case | Binary No. Held by Given Storage Unit | Binary No. Held by Preceding Storage Unit |
|---|---|---|
| I | 1 | 0 |
| II | 1 | 1 |
| III | 0 | 0 |
| IV | 0 | 1 |

In case I, the D and E terminals of the given storage unit sense +50 volts and 0 volt potential respectively. Rectifier 30 thus conducts current through resistor 38 from $B_1+$ to the anode terminal B of the preceding storage unit sufficient to make the potential of junction 32 be +50 volts; and similarly rectifier 31 draws current through resistor 40 sufficient to make the potential of junction 33 be 0 volts. Thus, since input terminal C is normally at +55 volts, rectifiers 28 and 29 are biased in a reverse direction by 5 volts and 55 volts respectively. Anode 9 of the given storage unit is conducting current which anode 10 is cut off. When a negative voltage pulse is applied over bus 2, driving terminal C down to 0 volt, rectifier 28 becomes conductive and a current pulse flows from $B_1+$ through resistor 38 and rectifier 28 to bus 2. This drops the potential at junction 32, and allows a current pulse to flow through capacitor 34, rectifier 35, and resistor 23, whereby the negative voltage pulse appearing across resistor 23 drives control electrode 11 negative, tending to cut off current conduction by anode 9 and switching the conduction state of multivibrator 7 to represent binary "0." The voltage pulse from bus 2, thus, is routed to side trigger the given storage unit into number agreement with the other preceding storage unit. Since rectifier 29 was not rendered conductive by the voltage pulse, the voltage pulse is not transferred to control electrode 12.

In the second case, the potentials sensed by the D and E terminals are reversed, i. e., 0 and +50 volts respectively. Therefore, it will be seen that a negative voltage pulse is transferred by rectifier 29 to control electrode 12. However, since in the second case, the given storage unit stores a binary "1," anode 10 is originally cut off and the negative voltage pulse applied to control electrode 12 has no effect whatever on these conduction states of multivibrator 7. Thus, the given storage unit remains untriggered and is, as desired, in number agreement with the preceding storage unit.

In cases III and IV, the sensed potentials are the same as set forth above for cases I and II, respectively. Therefore, in case III a negative voltage pulse from pulsing bus 2 is routed through rectifier 28 to control electrode 11. However, anode 9 is already cut off so that the pulse at control electrode 11 has no effect and, as desired, the given storage unit is left in number agreement with the preceding storage unit.

In case IV, the negative voltage pulse applied at terminal C is routed through rectifier 29 to control electrode 12; since anode 10 is originally conducting, the negative voltage pulse at control electrode 12 triggers the given storage unit to represent binary "1" and into number agreement with the preceding storage unit.

The use of rectifiers 30 and 31 as connecting links in sensing the anode terminals A and B of another storage unit is particularly advantageous since it is necessary to effectively prevent the voltage pulses received at input terminal C from being transferred to the sensed anodes. A pulse received at a sensed anode, due to the cross-coupling explained, is also applied to a control electrode in the sensed storage unit and may cause spurious triggering of the sensed storage unit. In our invention, even though a voltage pulse is passed by rectifier 28 or 29, it only serves to drop the potential of junction 32 or 33 below +50 volts, whereupon the current flow through rectifier 30 or 31 is stopped. It will be evident that a voltage pulse is always passed by the particular rectifier 28 or 29 leading to the D or E terminal sensing +50 volts. The pulse drives the junction 32 or 33 below +50 volts potential and supplies a reverse bias on the rectifier 30 or 31. Thus, the only voltage pulse felt by the sensed anode is that due to the stoppage of current flow through the rectifier 30 or 31 connected to the sensed anode at +50 volts, and by properly choosing the values of resistors 38 and 40 this stoppage of current is made to have little or no effect on the sensed storage unit. The sensing rectifiers 30 and 31, therefore, serve also as pulse filters.

The capacitors 34 and 36 are, as stated, D. C. blocking capacitors to prevent D. C. biasing effects on the control electrodes 11 and 12 by the network 27. However, before a negative voltage pulse is passed to, say control electrode 11, the capacitor 24 is charged to the polarity shown in the drawing—+50 volts potential at junction 32 and a negative cathode potential on the other side. However, in passing the voltage pulse to control electrode 11, the capacitor is discharged through rectifiers 28 and 35. Since it cannot recharge through rectifier 35, resistors 38 and 39 provide a charging circuit to be relatively high $B_1+$ potential. This insures that the capacitors 34 and 36 will be quickly recharged without affecting the operation of the multivibrator 7.

Having thus explained how the storage unit 1 of our invention is side triggered in response to a single voltage pulse and only two sensed potentials, only when it stores a number different from that represented by the sensed potentials, reference is now again made to Fig. 1 for a more complete description of the operation of the shifting register shown thereby. It has been shown that input terminal C is pulsed and a given storage unit 1 triggered, each time that a negative voltage pulse is supplied by pulsing bus 2, if and only if the preceding storage unit 1 stores a different binary number at the time of the pulse. Amplifier 3 may be any well-known two-stage positive feedback D. C. amplifier. One suitable form of amplifier 3 is more fully described both as to circuitry and operation as a component in the co-pending application Serial No. 237,832, now Patent No. 2,647,097, filed July 21, 1951, in the name of W. C. Hahn and assigned to the assignee of the present invention. Amplifier 3 has an output terminal 4 which is at high potential, say +50 volts, when its input voltage is high, i. e., above a predetermined critical positive voltage and which is at a low potential, say 0 volt, when the input voltage is low, i. e., below the predetermined positive voltage. Conversely, output terminal 5 is low in potential when the input voltage is high, and high in potential when the input voltage is low. Thus, output terminals 4 and 5 may be considered as B and A terminals respectively of a storage unit which stores a binary "1" when the input terminal 6 is high and a binary "0" when the input to terminal 6 is low. Assume that all storage units are initially storing a binary "0" and it is desired to shift the decimal number 11, i. e., the binary expression 1011, into the register. A pulse sequence voltage train such as that illustrated by curve 42, centered about the critical input voltage of amplifier 3, may be applied to the input terminal 6 of amplifier 3. Such a voltage train might be a shaped playback voltage of a magnetically recorded tape, for example. Simultaneously, a suitable negative voltage pulse source, i. e., pulsing bus 2 provides a synchronized negative voltage pulse train such as that illustrated by a curve 43. In keeping with the foregoing exemplary potentials, the pulses 43 drop the potential of bus 2 from +55 to 0 volts. At the instant that the first negative voltage pulse **43*a* arrives at the C terminals of all storage units 1, output terminals 4 and 5 are at +50 volt and 0 volt potentials, since the input to amplifier 3 is high (portion 42*a* of curve 42). Therefore, the first pulse 43*a* is routed to the control electrode 12 of the first storage unit 1 and triggers that storage unit to represent a binary "1." None of the other storage units are triggered because the pulse 43*a* is routed to their control electrodes 11 where it has no effect. When the second voltage pulse 43*b* occurs, the first storage unit senses a binary "1" from amplifier 3 (the input to amplifier 3 still being high at portion 42*b*) and so is not affected; the third and fourth storage units are not affected by pulse 43*b* either since they are sensing binary "0" at the second and third storage units and hold binary "0" themselves. However, the second storage unit stores a binary "0" and senses a binary "1" from the first storage unit. Thus, rectifier 29 in the second storage unit 1 is reverse biased by only five volts and the 43*b* pulse is routed to the control electrode 12 therein and triggers the second storage unit to hold binary "1." When the third voltage pulse 43*c* is applied to all of the input terminals C, the input voltage to amplifier 3 is low (portion 26*c*) and amplifier 3 represents a binary "0." Thus, the representation of the first storage unit 1 is triggered by pulse 43*c* from binary "1" to "0" and of the third storage unit from binary "0" to "1." When the fourth voltage pulse 43*d* occurs, the input to amplifier 3 is high (portion 42*d***) so that the potential at its output terminals are representative of binary "1." Thus, the representation of the first storage unit is changed from "0" to "1," of the second storage unit from "1" to "0," and of the fourth storage unit from "0" to "1," while that of the third storage unit is not switched since it originally held a binary "1" and sensed a "1" from the second storage unit. The shifting register then represents the binary expression 1011 by the conduction states of its storage units, which is the desired result.

The extreme simplicity of components, speed of operation, and reliability of the shifting register and of the storage unit components therein as shown and described are made possible by the various features of the invention, to wit, that the potentials of only two points need be sensed by any given storage unit, that received voltage pulses are not suppressed but merely routed to the proper control electrode to effect the action desired, and that received voltage pulses are effectively blocked by the sensing rectifiers from reaching sensed anodes and causing spurious triggering. We have found that the various unidirectional impedance devices or rectifiers shown may conveniently be of the crystal diode type, although other types may be employed, to form shifting register storage units and complete shifting registers which are economical, compact, and which prove highly successful under actual test performance. By way of example only and not by way of limiting this application thereto, the following circuit values, for the exemplary potentials given in connection with Fig. 2, have been found to give excellent performance in a particular construction of our invention:

| Resistor | Ohms | Capacitor | $\mu\mu$farads |
|---|---|---|---|
| 15 | 4,700 | 16 | 1,000 |
| 17 and 18 | 4,700 | 21 and 22 | 25 |
| 19 and 20 | 160,000 | 34 and 36 | 50 |
| 23 and 24 | 100,000 | | |
| 38 and 40 | 270,000 | | |
| 39 and 41 | 47,000 | | |

Discharge device 8—Type 12BH7 twin triode.
All rectifiers—Type 1N52.

In the use of the foregoing exemplary circuit constants and potentials in the shifting register storage units of our invention, we have found that pulsing or triggering rates of 200,000 pulses per second are successfully accommodated while the component (resistor and capacitor) values may vary ±10%, supply potentials may vary ±5% and the magnitude of the triggering voltage pulses may vary ±40% without any appreciable adverse effects on successful operation.

While the present invention has been described by reference to a particular embodiment thereof, it will be understood that numerous modifications may be made by those skilled in the art without actually departing from the invention. We, therefore, aim in the appended claims to cover all such equivalent variations as come within the true spirit and scope of the foregoing disclosure.

What we claim as new and desire to secure by Letters Patent of the United States is:

1. A binary system shifting register comprising a plurality of storage units each including a triggered multivibrator having two electric discharge devices, said discharge devices each having an anode, a cathode, and a control electrode, said multivibrator including two anode circuits and two corresponding control electrode circuits each cross-coupled to the other anode circuit; said multivibrator having two stable states of conduction each representative of one of two binary numbers during which said two anodes complementally reside each at one of two predetermined potentials, said multivibrator being responsive to voltage pulses of a predetermined polarity applied to a different one of said control electrodes during each stable conduction state which trigger said multivibrator to its other conduction state; said storage units each further including a potential-sensing and pulse-routing network comprising two potential-sensing terminals and a single negative voltage pulse input terminal, means including two unidirectional impedance devices oriented with like polarity each conductively connecting said input terminal and a different one of said control electrode circuits, rectifier means for biasing each of said unidirectional impedance devices with the potential sensed by a different one of said potential sensing terminals and for preventing negative voltage pulses received at said input terminal from being transferred over said potential sensing terminals in appreciable strength; each of said potential sensing terminals of each one of said storage units being connected to sense the potential at a respective one of said anodes in the storage unit preceding said one storage unit in the shifting sequence, whereby a negative voltage pulse applied to the said input terminal of said one storage unit causes triggering of said one storage unit only if the original conduction states of said one storage unit and said preceding storage unit are unlike.

2. For use in binary system computing apparatus, a shifting register storage unit comprising the combination of a triggered multivibrator including two cross-coupled electric discharge devices each having an anode, a cathode, and a control electrode, said multivibrator having two stable states of conduction each representative of one of two binary numbers and during alternate ones of which said anodes alternately reside each at one of two complementing potentials; and a potential-sensing and pulse-routing network for triggering said multivibrator only into number agreement with the binary number represented by complementing potentials at the anodes of another of said multivibrators, said potential-sensing and pulse-routing network including two first unidirectional impedance devices connected in series opposition and providing a junction therebetween for receiving triggering voltage pulses of a predetermined polarity, unidirectional impedance means connected between each of the anodes of said other storage unit and one of said first unidirectional impedance devices to supply the potential of each of said other storage unit anodes to a different one of said first unidirectional impedance devices, said unidirectional impedance means being poled to prevent appreciable transmission of triggering voltage pulses received at said junction and passed by said first unidirectional impedance devices from being transmitted to said other storage unit anodes, means for transferring triggering voltage pulses of said predetermined polarity received at said junction and passed by each of said first unidirectional impedance devices to a different one of said control electrodes including two capacitors for preventing D. C. biasing effects on said control electrodes by said network and two second unidirectional impedance devices for transferring voltage pulses only of said predetermined polarity through said capacitors to said control electrodes, and means for recharging said capacitors isolated from said control electrodes by said second unidirectional impedance devices.

3. For use in a binary system shifting register, a storage unit comprising in combination a triggered multivibrator including two electric discharge devices each having an anode, a cathode, and a control electrode, an anode circuit and a control electrode circuit for each of said discharge devices; and means cross-coupling the anode circuit of each of said discharge devices to the control electrode circuit of the other of said discharge devices whereby said multivibrator has two stable states of conduction each representative of one of two binary numbers during alternate ones of which said anodes alternately reside each at one of two complementing potentials; a source of negative voltage pulses normally at a positive potential, and a potential-sensing and pulse-routing network including two gating circuits each comprising first and second rectifiers connected to a junction therebetween and poled to conduct current away from said junction, a capacitor connected to said junction, a third rectifier connected between said capacitor and one of said control electrodes and poled to conduct current toward said junction, means for charging said capacitor including a source of positive potential, a resistor connected to said junction to be supplied by said source of positive potential, and a resistor connected between said capacitor opposite said junction and one of said cathodes, the said first rectifiers of said two gating circuits having terminals opposite said junctions for connection each to a different anode in another storage unit, the said second rectifiers of said two gating circuits having terminals opposite said junctions for connection to said source of negative voltage pulses, whereby said second unidirectional impedance devices are so biased that each negative voltage pulse supplied to said second unidirectional impedance devices is transmitted only to a predetermined one of said control electrodes for a given number represented by the conduction state of said other storage unit.

4. For use in binary system computing apparatus having a source of voltage pulses, a potential-sensing and pulse-routing network comprising two gating circuits each including first and second unidirectional impedance devices connected in series opposition and providing a junction therebetween, an impedance connected between said junction and a source of fixed potential, a capacitor connected to said junction, a third unidirectional impedance device connected in series with said capacitor and poled in a sense opposite with respect to said junction to the polarity of said second unidirectional impedance device, and circuit means for passing current through said capacitor in a direction opposite to which current flowing through said third unidirectional impedance device passes through said capacitor; the said first unidirectional impedance devices in said two gating circuits having terminals opposite said junctions each for connecton to a different one of two points of complemental number-representing potentials, the said third unidirectional impedance devices in said two gating circuits providing terminals for connection each to a different one of two pulse receiving circuits, and the said second impedance devices in said two gating circuits having terminals opposite said junctions for connection to the source of voltage pulses; whereby voltage pulses of a predetermined polarity are transmitted to one or the other of said pulse receiving circuits depending upon the number represented by said complemental potentials.

5. For use in a shifting-register triggered multivibrator storage unit adapted to be actuated from a source of voltage pulses and having two electric discharge devices each including an anode, a cathode, and a control electrode and having two stable states of conduction, a potential sensing and pulse routing network, comprising a common source of potential, two gating circuits each including a first and a second rectifier connected in serially opposed relation, a resistor for connecting the junction of said first and second rectifiers to said common source of potential, a capacitor connected to said junction and a third rectifier connected at one terminal thereof in series with said capacitor and provided to be connected at its other terminal to a respective one of said control electrodes, said first rectifiers of said gating circuits having a common terminal opposite the respective junctions for connection to said source of voltage pulses, and said second rectifiers having respective terminals opposite the corresponding junctions for connection to a number-representing potential.

6. A binary system shifting register comprising, a source of voltage pulses of like polarity, a plurality of cascade connected storage units each including a bistable device, each of said devices having first and second control electrodes and first and second output terminals, said first and second output terminals being respectively at a first and a second of two predetermined potentials during a first stable state of said device and being respectively at said second and said first of said two predetermined potentials during a second stable state of said device, each of said bistable devices being such that voltage pulses of like polarity simultaneously applied to both said first and said second control electrodes will always trigger said device from one stable state to the other; each one of said storage units further including a potential-sensing and pulse-routing network comprising, first and second potential sensing terminals respectively connected to the first and second output terminals of the bistable device of the preceding storage unit in said plurality of cascaded units, a single voltage pulse input terminal connected to said source of like polarity voltage pulses, means including two unidirectional impedance devices oriented with like polarity with respect to said voltage pulse input terminal and each conductively connecting said terminal with a different one of said first and second control electrodes of said bistable device of said one storage unit; and rectifier means for biasing each of said unidirectional impedance devices with the potential sensed by a different one of said first and second potential sensing terminals and for preventing voltage pulses received at said voltage pulse input terminal from being transferred over said potential sensing terminals in appreciable strength, whereby a voltage pulse applied to said voltage pulse input terminal of said one storage unit causes triggering of said bistable device of said one storage unit if and only if the original stable states of the bistable devices of said one storage unit and of said preceding storage unit are unlike.

7. For use in binary system computing apparatus utilizing complemental number-representing potentials and having a source of voltage pulses, a potential-sensing and pulse routing network having first and second terminals each adapted to be connected to a different one of two of said complemental number-representing potentials, a third terminal adapted to be connected to said source of voltage pulses, and fourth and fifth terminals each adapted to be connected to a different one of two pulse receiving circuits; said potential-sensing and pulse-routing network comprising, first and second rectifiers connected in series opposition between said first and third terminals, third and fourth rectifiers connected in series opposition between said second and third terminals, said second and said fourth rectifiers each having like polarity with respect to said third terminal and said first and third rectifiers having like polarity with respect to said first and second terminals respectively, a first capacitor connected to the junction between said first and second rectifiers, a second capacitor connected to the junction between said third and fourth rectifiers, a fifth rectifier connected in series between said first capacitor and said fourth terminal, said fifth rectifier having a polarity opposite to that of said first and second rectifiers with respect to the junction between said first and second rectifiers, a sixth rectifier connected in series between said second capacitor and said fifth terminal, said sixth rectifier having a polarity opposite to that of said third and fourth rectifiers with respect to the junction between said third and fourth rectifiers; and first and second circuit means for passing current through said first and second capacitors respectively in a direction opposite to that in which current flowing through said fifth and sixth rectifiers respectively passes through said first and second capacitors, whereby pulses applied to said third terminal may be selectively routed to one of said fourth and fifth terminals by complemental number-representing potentials applied to said first and second terminals, said pulses having substantially no effect upon the potentials applied to said first and second terminals.

References Cited in the file of this patent

UNITED STATES PATENTS

| | | |
|---|---|---|
| 2,503,765 | Rajchman et al. | Apr. 11, 1950 |
| 2,557,729 | Eckert | June 19, 1951 |
| 2,568,932 | Rajchman et al. | Sept. 25, 1951 |
| 2,580,771 | Harper | Jan. 1, 1952 |
| 2,622,193 | Clayden | Dec. 16, 1952 |
| 2,644,887 | Wolfe | July 7, 1953 |
| 2,712,065 | Elbourn | June 28, 1955 |

OTHER REFERENCES

"Third Interim Progress Report on the Psysical Realization of an Electronic Computing Instrument," Institute of Advanced Study, Princeton, N. J., Jan. 1, 1948 (pages 128 through 133).

Electronic Engineering, "The Physical Realization of an Electronic Digital Computer" by A. D. Booth, Dec. 1950 (pages 492–498).

Proc. of the IRE, "Diode Coincidence and Mixing Circuits in Digital Computers" by Chen (pp. 511 to 514) May 1950.